US012666417B2

(12) United States Patent
Chen et al.

(10) Patent No.: US 12,666,417 B2
(45) Date of Patent: Jun. 23, 2026

(54) CHANNEL INFORMATION SENDING METHOD, CHANNEL INFORMATION RECEIVING METHOD, AND RELATED DEVICE

(71) Applicant: VIVO MOBILE COMMUNICATION CO., LTD., Dongguan (CN)

(72) Inventors: Xiaohang Chen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 321 days.

(21) Appl. No.: 18/221,422

(22) Filed: Jul. 13, 2023

(65) Prior Publication Data

US 2023/0362912 A1     Nov. 9, 2023

Related U.S. Application Data

(63) Continuation of application No. PCT/CN2022/070976, filed on Jan. 10, 2022.

(30) Foreign Application Priority Data

Jan. 13, 2021     (CN) .......................... 202110043143.0

(51) Int. Cl.
*H04W 72/12*     (2023.01)
*H04W 24/10*     (2009.01)

(52) U.S. Cl.
CPC ........... *H04W 72/12* (2013.01); *H04W 24/10* (2013.01)

(58) Field of Classification Search
CPC . H04W 72/12; H04W 72/1268; H04W 72/23; H04L 5/0057; H04L 5/0092; H04L 5/0012; H04L 5/0026; H04L 5/0048; H04L 5/0044; H04L 5/0082; H04L 5/0053; H04L 5/0094; H04L 1/1819; H04L 1/1822; H04L 1/1864; H04L 1/1887; H04L 1/1893; H04L 1/0027
USPC .................................................. 370/329–330
See application file for complete search history.

(56) References Cited

U.S. PATENT DOCUMENTS

| | | | |
|---|---|---|---|
| 2020/0177254 A1* | 6/2020 | Lee ......................... | H04B 7/063 |
| 2022/0030609 A1* | 1/2022 | Huang .............. | H04W 52/0219 |
| 2022/0052826 A1* | 2/2022 | Yang ...................... | H04W 72/23 |
| 2022/0124736 A1* | 4/2022 | Huang .................. | H04W 72/23 |

(Continued)

FOREIGN PATENT DOCUMENTS

| | | |
|---|---|---|
| CN | 104038312 A | 9/2014 |
| CN | 109802813 A | 5/2019 |

(Continued)

OTHER PUBLICATIONS

Extended European Search Report issued in related European Application No. 22738953.3, mailed May 15, 2024, 9 pages.

(Continued)

*Primary Examiner* — Candal Elpenord
(74) *Attorney, Agent, or Firm* — IPX PLLC

(57) ABSTRACT

A channel information sending method, a channel information receiving method, and a terminal are provided. The channel information sending method includes: receiving a first downlink grant. The first downlink grant is used to indicate reporting of Channel State Information (CSI). The method further includes sending a CSI report on a target Physical Uplink Shared Channel (PUSCH) resource.

16 Claims, 5 Drawing Sheets

A network side device sends a first downlink grant, where the first downlink grant is used to indicate reporting of CSI ⟋ 401

The network side device receives a CSI report on a target PUSCH resource ⟋ 402

(56)                  References Cited

U.S. PATENT DOCUMENTS

| | | | | |
|---|---|---|---|---|
| 2022/0124740 A1* | 4/2022 | Ji | ............................ | H04B 7/024 |
| 2022/0183079 A1* | 6/2022 | Ouchi | ................. | H04W 74/006 |
| 2023/0068109 A1* | 3/2023 | Bagheri | ................ | H04L 1/1896 |
| 2023/0126986 A1* | 4/2023 | Hao | ...................... | H04W 72/54 |
| | | | | 370/329 |

FOREIGN PATENT DOCUMENTS

| | | | |
|---|---|---|---|
| CN | 110741580 | A | 1/2020 |
| CN | 111436128 | A | 7/2020 |
| CN | 111526591 | A | 8/2020 |
| WO | 2013063802 | A | 5/2013 |
| WO | 2022035644 | A | 2/2022 |

OTHER PUBLICATIONS

NEC: "CSI feedback enhancement", 3GPP Draft; R1-2008847, Nov. 2020, 3 pages.
International Search Report issued in corresponding International Application No. PCT/CN2022/070976, mailed Mar. 2, 2022, 4 pages.
Intel Corporation, "Layer 1 enhancements for eURLLC", 3GPP TSG RAN WG1 Meeting #94b R1-1810785, Oct. 2018, 11 pages.

* cited by examiner

401

A network side device sends a first downlink grant, where the first downlink grant is used to indicate reporting of CSI

402

The network side device receives a CSI report on a target PUSCH resource

CHANNEL INFORMATION SENDING METHOD, CHANNEL INFORMATION RECEIVING METHOD, AND RELATED DEVICE

CROSS-REFERENCE TO RELATED APPLICATIONS

This application is a continuation of International Application No. PCT/CN2022/070976, filed on Jan. 10, 2022, which claims priority to Chinese Patent Application No. 202110043143.0, filed on Jan. 13, 2021. The entire contents of each of the above-referenced applications are expressly incorporated herein by reference.

TECHNICAL FIELD

This application relates to the field of communication technologies, and in particular to a channel information sending method, a channel information receiving method, and a related device.

BACKGROUND

A network side device schedules downlink data transmission based on Channel State Information (CSI) reported by a terminal. In a conventional technology, the terminal usually, reports the CSI in a periodic reporting manner. However, in the periodic reporting method for the CSI, when the CSI is reported for a long period, the CSI based on which the network side device schedules the downlink data transmission may have expired. This results that reliability of data transmission is low.

SUMMARY

This application provides a channel information sending method, a channel information receiving method, and a related device.

According to a first aspect, a channel information sending method is provided. The method includes:

A terminal receives a first downlink grant, where the first downlink grant is used to indicate reporting of channel state information CSI.

The terminal sends a CSI report on a target Physical Uplink Shared Channel (PUSCH) resource.

According to a second aspect, a channel information receiving method is provided. The method includes:

A network side device sends a first downlink grant, where the first downlink grant s used to indicate reporting of CSI.

The network side device receives a CSI report on a target PUSCH resource.

According to a third aspect, a channel information sending apparatus is provided. The apparatus includes:

a first receiving module, configured to receive, by a terminal, a first downlink grant, where the first downlink grant is used to indicate reporting of channel state information CSI; and a first sending module, configured to send, by the terminal, a CSI report on a target physical uplink shared channel PUSCH resource.

According to a fourth aspect, a channel information receiving apparatus is provided. The apparatus includes:

a second sending module, configured to send, by a network side device, a first downlink grant, where the first downlink grant is used to indicate reporting of CSI; and a second receiving module, configured to receive, by the network side device, a CSI report on a target PUSCH resource.

According to a fifth aspect, a terminal is provided, where the terminal includes a processor, a memory, and a program or instructions that are stored in the memory and that can be run on the processor, where when the program or instructions are executed by the processor, steps of the method according to the first aspect are implemented.

According to a sixth aspect, a network side device is provided, where the network side device includes a processor, a memory, and a program or instructions that are stored in the memory and that can be run on the processor, and when the program or the instructions are executed by the processor, steps of the method according to the second aspect are implemented.

According to a seventh aspect, a readable storage medium is provided, where the readable storage medium stores a program or instructions, and when the program or the instructions are executed by a processor, steps of the method according to the first aspect or the second aspect are implemented.

According to an eighth aspect, a chip is provided. The chip includes a processor and a communication interface, the communication interface is coupled to the processor, and the processor is configured to run a program or instructions of a network side device to implement the method in the first aspect or the method in the second aspect.

According to a ninth aspect, a computer program product is provided. The computer program product is stored in a non-volatile storage medium, and the computer program product is executed by at least one processor to implement the method described in the first aspect or to implement the method described in the second aspect.

According to a tenth aspect, a communication device is provided, where the communication device is configured to perform the method according to the second aspect.

In this embodiment of this application, the network side device may send the downlink grant, and indicate the reporting of the CSI. The terminal may send the CSI report on the target PUSCH resource in response to this downlink grant. In this way, when scheduling downlink data transmission, the network side device may trigger the terminal to report the CSI report by the downlink grant, so that when downlink signaling overhead is saved, channel information is updated in a timely manner and reliability of data transmission is improved.

DETAILED DESCRIPTION

The following clearly describes technical solutions in embodiments of this application with reference to the accompanying drawings in embodiments of this application. Apparently, the described embodiments are some rather than all of embodiments of this application. Based on embodiments of this application, all other embodiments obtained by a person of ordinary skill in the art without creative efforts fall within the protection scope of this application.

The terms "first", "second", and the like in the description and the claims of this application are used to distinguish between similar objects instead of describing a specific order or sequence. It should be understood that, the terms used in such a way is interchangeable in proper circumstances, so that embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that the technology described in this application is not limited to a Long Term Evolution (LTE)/LTE-Advanced (LTE-A) system, and may also be used in other wireless communication systems, for example, Code Division Multiple Access (CDMA), Time Division Multiple Access (TDMA), Frequency Division Multiple Access (FDMA), Orthogonal Frequency Division Multiple Access (OFDMA), and Single-Carrier Frequency-Division Multiple Access (SC-FDMA). The terms "system" and "network" in embodiments of this application may be used interchangeably. The technologies described can be applied to both the systems and the radio technologies mentioned above as well as to other systems and radio technologies. However, a New Radio (NR) system is described below for an illustration purpose, and the term NR is used in most of the descriptions, although these technologies can also be used in an application other than an NR system application, for example, a 6$^{th}$ Generation (6G) communication system.

Figure 1:
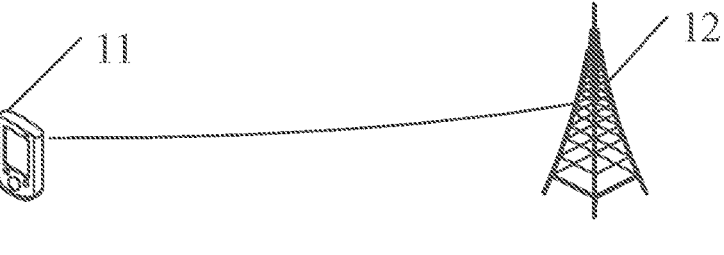
FIG. 1 is a block diagram of a wireless communication system according to some embodiments of this application.

FIG. 1 is a block diagram of a wireless communication system to which an embodiment of this application may be applied. The wireless communication system includes a terminal 11 and a network side device 12. The terminal 11 may also be referred to as a terminal device or a User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a bracelet, a headset, and glasses. It should be noted that a specific type of the terminal 11 is not limited in this embodiment of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a Wireless Fidelity (Wi-Fi) node, a Transmission and Reception Point (TRP), or another appropriate term in the field, and the base station is not limited to a specific technical term provided that a same technical effect is achieved.

For ease of understanding, the following describes some content in embodiments of this application.

1. Service Scenario in NR:

Three use scenarios of the new radio are mainly considered in a technology standardization process of the NR: an enhanced Mobile BroadBand (eMBB), massive Machine Type Communication (mMTC), and Ultra-Reliable and Low Latency Communication (URLLC). In terms of a data rate, latency, reliability, a quantity of connections, service volume density, mobility, and the like, performance requirements for the three use scenarios are significantly different. The eMBB scenario focuses on the data rate and the service volume density, the mMTC scenario focuses on the quantity of connections, and the URLLC scenario focuses on the latency and the reliability. Because these scenarios are closely related to a service attribute and a carrying requirement, these scenarios are subsequently referred to as service scenarios.

2. Triggering and Feedback of Aperiodic CSI in NR

An NR communication system supports a downlink aperiodic CSI reporting mechanism. For example, a base station may trigger, based on uplink scheduling Downlink Control Information (DCI), downlink CSI to be transmitted on a scheduled PUSCH as needed.

The base station may pre-configure an Aperiodic Trigger State List (ATSL) for UE by Radio Resource Control (RRC) signaling, each state corresponds to a list of associated reporting configuration information, and each piece of reporting configuration information indicates how to report and which CSI-RS resource set is used.

The uplink scheduling DCI has a format of 0_1, and indicates an actually triggered pre-configured aperiodic trigger state based on a "CSI request" field, and reporting information of corresponding CSI is carried on the scheduled PUSCH.

An offset K2 (unit: slot) between a slot at which the scheduled PUSCH is located and a slot at which the uplink scheduled DCI is located is determined as follows:

In a case that the PUSCH carries a Transport Block (TB) and does not carry/carries reporting information of downlink aperiodic CSI, a "time domain resource assignment" field is used as an index to determine an effective row in a pre-configured or specified table, and a slot offset in the effective row is used as a used K2 value.

In a case that the PUSCH does not carry the transport block, but carries only the reporting information of the downlink aperiodic CSI, the "time domain resource assignment" field is used as an index to determine an effective reporting slot offset in a list of reporting slot offsets of reporting configuration information that is in a list of reporting configuration information corresponding to an actually triggered aperiodic trigger state, and a maximum slot offset in one or more reporting slot offsets (a quantity of reported slot offsets=a quantity of pieces of reporting configuration information in the list) is used as the used K2 value.

A first uplink symbol after $T_{proc,CSI}=(Z)(2048+144)\cdot \kappa 2^{-\mu}\cdot T_c$, where Z is an end moment relative to triggering of the DCI; and a first uplink symbol after $T'_{proc,CSI}=(Z')(2048+144)\cdot$ $\kappa 2^{-\mu}\cdot T_c$, where Z' is an end moment of a last symbol relative to an occupied latest resource in used aperiodic measurement resources.

Z and Z' may be referred to corresponding values in Table 1 or Table 2 in different cases.

TABLE 1

| CSI computation delay requirement 1 | | |
| --- | --- | --- |
| | $Z_1$ (symbol) | |
| μ | $Z_1$ | $Z'_1$ |
| 0 | 10 | 8 |
| 1 | 13 | 11 |
| 2 | 25 | 21 |
| 3 | 43 | 36 |

TABLE 2

| CSI computation delay requirement 2 | | | | | |
| --- | --- | --- | --- | --- | --- |
| | $Z_1$ (symbol) | | $Z_2$ (symbol) | | $Z_3$ (symbol) |
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | $\min(44, X_3 + KB_1)$ | $X_3$ |
| 3 | 97 | 85 | 152 | 140 | $\min(97, X_4 + KB_2)$ | $X_4$ |

When the scheduled PUSCH does not meet, the foregoing requirement for a time location, the UE may ignore reporting of corresponding aperiodic CSI (when not multiplexed with a Hybrid Automatic Repeat Request Acknowledgement (HARQ-ACK) or a TB, or does not update corresponding CSI.

Figure 2:
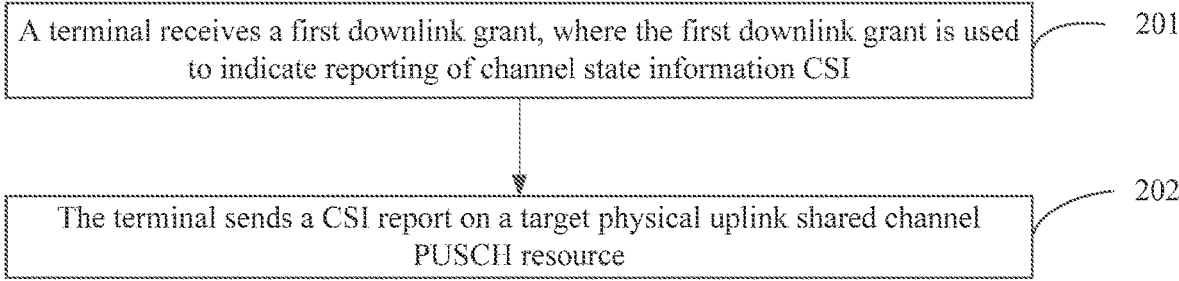
FIG. 2 is a flowchart of a channel information sending method according to an embodiment of this application.

FIG. 2 is a flowchart of a channel information sending method according to an embodiment of this application. The channel information sending method in this embodiment of this application may be performed by a terminal.

As shown in FIG. 2, the channel information sending method may include the following steps.

Step 201: A terminal receives a first downlink grant, where the first downlink grant is used to indicate reporting of channel state information CSI.

In this embodiment of this application, Downlink (DL grant may be used to indicate the reporting of the CSI, that is, the downlink grant may trigger the reporting of the CSI.

In an implementation, the downlink grant used to indicate the reporting of the CSI may be: DCI, or Media Access Control (MAC) Control Element (CE), but is not limited thereto.

Figures 3, 4:
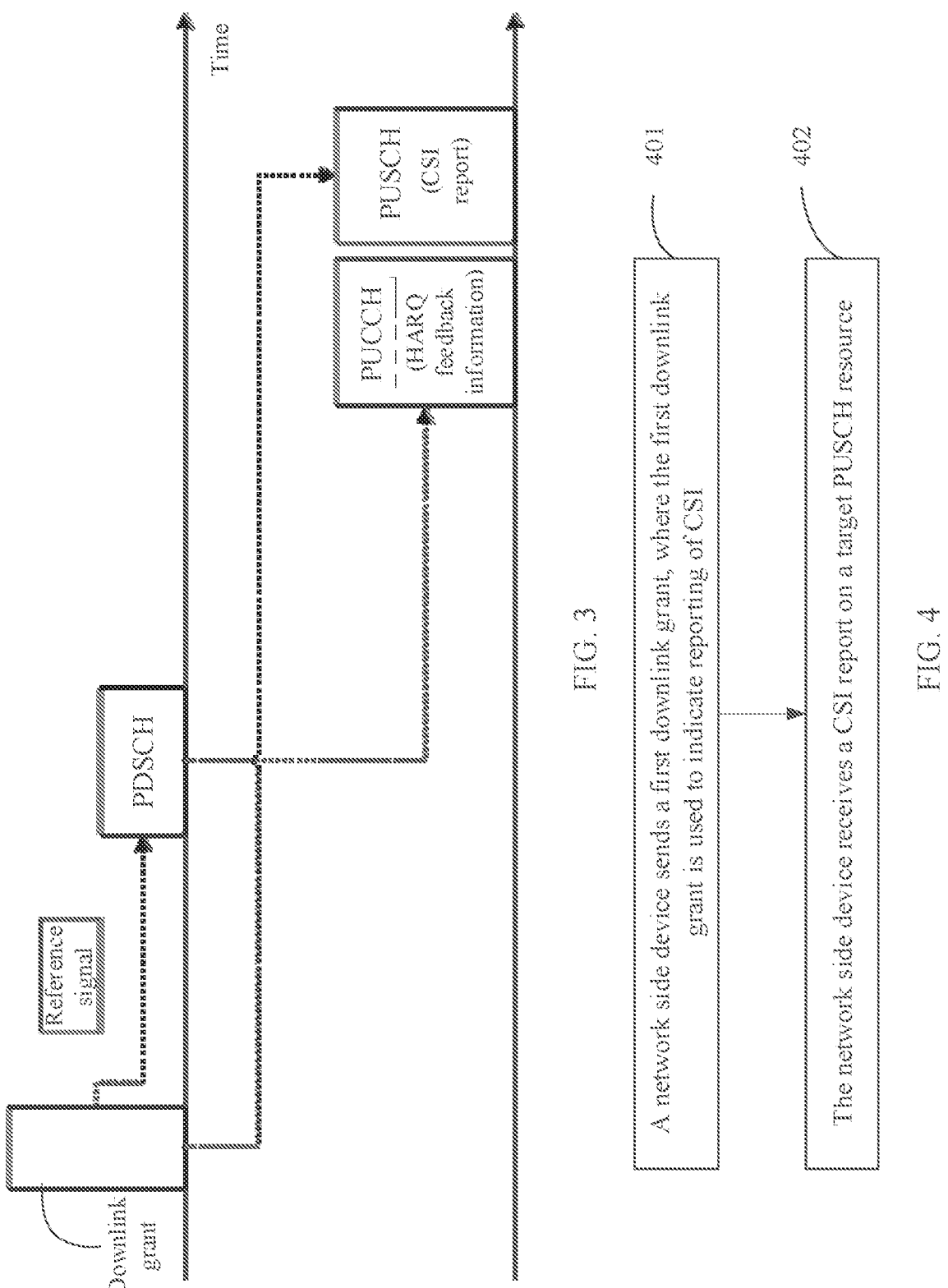
FIG. 3 is a schematic diagram of information transmission according to an embodiment of this application.
FIG. 4 is a flowchart of a channel information receiving method according to an embodiment of this application.

As shown in FIG. 3, the DL grant may be used to: schedule a Physical Downlink Shared Channel (PDSCH), and trigger the reporting of the CSI.

In addition, in FIG. 3, a CSI report triggered by the DL grant may be transmitted through a Physical Uplink Shared Channel (PUSCH). Hybrid Automatic Repeat Request (HARQ) feedback information corresponding to the PDSCH scheduled by DL grant may be transmitted through a Physical Uplink Control Channel (PUCCH). The network side device may also send a Reference Signal (RS), for example, a CSI-RS, for a channel or interference measurement, to obtain the CSI report.

It should be noted that the DL grant in FIG. 3 is only an example. In other implementations, the DL grant may be a DL grant without scheduling the PDSCH. For example, the DL grant may be DCI used to trigger a one-shot HARQ-ACK codebook, or DCI used to trigger a Secondary Cell (SCell) dormancy indication.

Step 202: The terminal sends the CSI report on a target physical uplink shared channel PUSCH resource.

In practical application, after receiving the downlink grant, the terminal may detect whether the received downlink grant is used to indicate the reporting of the CSI. In a case that the received downlink grant is used to indicate the reporting of the CSI, the terminal may send the CSI report over the target PUSCH resource; and in a case that the received downlink grant is not used to indicate the reporting of the CSI, the process may end.

In this embodiment of this application, in addition to sending the CSI report on the target PUSCH source, the terminal may further send at least one of the following on the target PUSCH resource: HARQ feedback information corresponding to the PDSCH scheduled by a first uplink grant, or other uplink data. In this way, utilization of the target PUSCH resource is improved and overhead of uplink signaling is saved.

According to the channel information sending method in this embodiment of this application, the terminal may send the CSI report on the target PUSCH resource in response to the first downlink grant that is received and used to indicate the reporting of the CSI. In this way, when scheduling downlink data transmission, the network side device may trigger the terminal to report the CSI report by the downlink grant, so that when downlink signaling overhead is saved, channel information is updated in time and reliability of data transmission is improved.

In this embodiment of this application, the PUSCH resource may include at least one transmission parameter. For example, the PUSCH resource may include at least one of the following transmission parameters:

a time domain resource; a frequency domain resource; a frequency domain hopping parameter; a Demodulation Reference Signal (DMRS) configuration/parameter; a precoder and a quantity of layers; a Sounding Reference Signal (SRS) resource indicator; a number of an antenna port; a Modulation and. Coding Scheme (MCS); an uplink transmission waveform; a Beta-offset for Uplink Control Information (UCI) multiplexing; an open-loop power control parameter; a closed-loop power control parameter; an HARQ process number; a quantity of HARQ processes; a Redundant Version (RV); and a quantity of repetitions.

Further, the frequency domain resource may include a size of a Resource Block Group (RBG); the frequency domain hopping parameter may include a hopping mode and a hopping offset; the DMRS configuration/parameter may include a DMRS sequence initialization parameter; and the open-loop power control parameter may include P0 and/or α.

In this embodiment of this application, the transmission parameter of the PUSCH resource may be set by the network side device and/or predefined in a protocol.

In this embodiment of this application, the network side device may set the transmission parameter of the PUSCH resource by the downlink grant. It may be learned that, in this embodiment of this application, the downlink grant may also be used to indicate the transmission parameter of the PUSCH resource.

In this embodiment of this application, the network side device may also set the transmission parameter of the PUSCH resource based on at least one of other pieces of downlink information, for example, an RRC signaling or a MAC CE. This may be determined based on an actual situation, and is not limited in this embodiment of this application.

Based on the foregoing content, it may be understood that, for example, a transmission parameter of the target PUSCH resource may be determined by at least one of the following: first downlink grant indication, radio resource control RRC signaling configuration, or predefinition in a protocol. In this way, flexibility and diversity of determining of the transmission parameter of the target PUSCH resource are improved.

In the implementations, the downlink grant for triggering the reporting of the CSI is the same as the downlink grant for indicating the transmission parameter of the PUSCH resource. It should be noted that, in other implementations, the downlink grant for triggering the reporting of the CSI may be different from the downlink grant for indicating the transmission parameter of the PUSCH resource. This may be determined based on an actual situation, and is not limited in this embodiment of this application.

In some embodiments, a time domain resource of the target PUSCH resource is determined based on a first time domain resource. The first time domain resource is determined based on P reference moments and Q time domain offsets, and P and Q are positive integers.

The Q time domain offsets are determined by at least one of the following: the first downlink grant indication; the RRC signaling configuration; or the predefinition in a protocol.

In this implementation, the time domain resource of the target PUSCH resource is determined based on the first time domain resource. A relationship between the time domain resource of the target PUSCH resource and the first time domain resource is described as follows.

In a first implementation, the time domain resource of the target PUSCH resource may be the first time domain resource.

In a second implementation, the time domain resource of the target PUSCH resource may be the first available uplink time domain resource after the first time domain resource.

In the second implementation, the first available uplink time domain resource after the first time domain resource may be determined by at least one of the following: a Time Division Duplex (TDD) configuration, a dynamic TDD configuration, or an RRC configuration. This may be determined based on an actual situation, and is not limited in this embodiment of this application.

In this implementation, the first time domain resource is determined based on the reference moments and the Q time domain offsets.

In an implementation, the first time domain resource may be determined based on some or all of the P reference moments, and/or, some or all of the Q time domain offsets. The following describes the determining of the first time domain resource.

In some embodiments, the first time domain resource is determined when at least one of the following is satisfied.

(1) The first time domain resource is located after a first reference moment, and there is a first time domain offset between the first time domain resource and the first reference moment, the first reference moment is a last reference moment of T reference moments after being sequentially arranged in chronological order. The first time domain offset is a largest time domain offset in S time domain offsets, or a sum of the S time domain offsets.

(2) The first time domain resource is a last time domain resource after L time domain resources are sequentially arranged in chronological order, each time domain resource in the L time domain resources is determined based on at least one reference moment in the T reference moments and at least one time domain offset in the S time domain offsets, reference moments and/or time domain offsets corresponding to different time domain resources are different.

The T reference moments are T reference moments in the P reference moments, and T is a positive integer less than or equal to P. The S time domain offsets are S time domain offsets in the Q time domain offsets, S is a positive integer less than or equal to Q, and L is an integer greater than or equal to S or T.

In (1), the implementation may include:

Implementation 1: The first reference moment is the last reference moment of the T reference moments after being sequentially arranged in chronological order, and the first time domain offset is the largest time domain offset in the S time domain offsets.

Implementation 2: The first reference moment is the last reference moment of the T reference moments after being sequentially arranged in chronological order, and the first time domain offset is the sum of the S time domain offsets.

For ease of understanding, example descriptions are as follows:

It is assumed that the T reference moments include 3 reference moments, and the 3 reference moments are sequentially arranged in chronological order: a reference moment 1, a reference moment 2, and a reference moment 3; and the S time domain offsets include two time domain offsets: time domain offset 1 and time domain offset 2, and the time domain offset 1 is larger than the time domain offset 2.

Then, for the implementation 1, the first time domain resource is located after the reference moment 3, and there is a time domain offset 1 between the first time domain resource and the reference moment 3. For the implementation 2, the first time domain resource is located after the reference moment 3, and the time domain offset 1 and the time domain offset 2 are between the first time domain resource and the reference moment 3.

In (2), the implementation may include:

Implementation a: In a case that S is equal to T, for example, each time domain resource in the L time domain resources may be determined based on one reference moment in the T reference moments and one domain offset in the S time domain offsets, and the reference moments and time domain offsets for determining different time domain resources are different. In this implementation, L, S, and T are all equal.

For example, it is assumed that the T reference moments include 2 reference moments: a reference moment 1 and a reference moment 2 respectively; and the S time domain offsets include 2 time domain offsets: time domain offset 1 and time domain offset 2 respectively.

The L time domain resources may include a time domain resource 1 and a time domain resource 2. In some embodiments, the time domain resource 1=the reference moment 1+the time domain offset 1, in other words, the time domain resource 1 may be located after the reference moment 1, and the time domain offset 1 is between the time domain resource 1 and the reference moment 1. The time domain resource 2=the reference moment 2+the time domain offset 2, in other words, the time domain resource 2 may be located after the reference moment 2, and the time domain offset 1 is between the time domain resource 2 and the reference moment 2.

Implementation b: In a case that S is greater than T, for example, a determination method of T−1 time domain resources in the L time domain resources may be the same as the determination method of the time domain resources in implementation a, and the remaining time domain resources may be determined based on an unused reference moment and an unused time domain offset.

For example, it is assumed that the T reference moments include 2 reference moments: a reference moment 1 and a reference moment 2 respectively; and the S time domain offsets include 3 time domain offsets: time domain offset 1, time domain offset 2, and time domain offset 3 separately.

The L time domain resources may include the time domain resource 1 and the time domain resource 2. In some embodiments, the time domain resource 1=the reference moment 1 the time domain offset 12 and the time domain resource 2=the reference moment 2 the time domain offset 2+the time domain offset 3, in other words, the time domain resource 2 may be located after the reference moment 2, and the time domain offset 2 and the time domain offset 3 are between the time domain resource 2 and the reference moment 2.

Implementation c: In a case that S is smaller than T, for example, a determination method of S time domain resources in the L time domain resources may be the same as the determination method of the time domain resources in implementation a, and the remaining time domain resources may be determined based on an unused reference moment.

For example; it is assumed that the T reference moments include 3 reference moments: a reference moment 1, a reference moment 2, and a reference moment 3 separately; and the S time domain offsets include 2 time domain offsets: time domain offset 1 and time domain offset 2 respectively.

The L time domain resources may include the time domain resource 1, the time domain resource 2, and the time domain resource 3; for example, the time domain resource 1=the reference moment 1+the time domain offset 1; the time domain resource 2=the reference moment 2+the time domain offset 2; the time domain resource 3=the reference moment 3+the time domain offset 1+the time domain offset 2; the time domain resource 3=the reference moment 3+the time domain offset 1; or the time domain resource 3=the reference moment 3+the time domain offset 2.

It should be noted that the implementations in FIG. 2 are only examples, and do not limit a protection scope of 2). A unit of the time domain resource may be a slot, a subslot, or a symbol. This may be determined according to an actual situation, and is not limited in this embodiment of this application.

The following describes the Q time domain offsets and the P reference moments.

1. For Q Time Domain Offsets.

The Q time domain offsets may be configured by a network side and/or predefined in a protocol. In some embodiments, the Q time domain offsets are determined by at least one of the following: first downlink grant indication; PAC signaling configuration; or predefinition in a protocol.

In the implementations, the downlink grant for triggering the reporting of the CSI is the same as the downlink grant for indicating the domain offset. It should be noted that, in other implementations, the downlink grant for triggering the reporting of the CSI may be different from the downlink grant for indicating the domain offset. This may be determined according to an actual situation, and is not limited in this embodiment of this application.

In some embodiments, the Q time domain offsets may be determined based on a processing time.

The processing time is: a time for which the CSI is calculated; or a time for which a physical downlink shared channel PDSCH is processed. The processing time of the PDSCH may be understood as time at which receives the PDSCH and that is predefined in a protocol.

In an implementation, in an implementation, the processing time may be directly determined as the time offset; and in another implementation, the time offset may be determined based on the processing time and Timing Advance (TA). For example; the time offset=the processing time+TA. This is not limited thereto.

2. For P Reference Moments.

In some embodiments, the P reference moments may include at least one of the following:

a moment at which the first downlink grant is received;

a moment at which hybrid automatic repeat request HARQ feedback information is transmitted, where the HARQ feedback information is HARQ feedback information corresponding to a PDSCH of first downlink grant scheduling; or a moment at which a first reference signal is received, where the first reference signal is a reference signal corresponding to the CSI report.

In an implementation, the first reference signal may be a reference signal for a channel measurement, for example, a CSI-RS, or a reference signal for an interference measurement, for example, a CSI Interference Measurement (CSI-IM).

In this embodiment of this application; there may be one or more PUSCH resources used to transmit the CSI report. In a case that there is one PUSCH resource used to transmit the CSI report, the target PUSCH resource is the PUSCH resource. In a case that there are a plurality of PUSCH resources used to transmit the CSI report, the target PUSCH resource is one PUSCH resource in the plurality of PUSCH resources.

For example, the target PUSCH resource is any one of the following:

(a) A PUSCH resource corresponding to identification information of first downlink grant indication.

(b) A PUSCH resource associated with the CSI report.

(c) A PUSCH resource determined by the terminal based on a magnitude of load of the CSI report.

In this embodiment of this application, the downlink grant may also be used to indicate the PUSCH resource for transmitting the CSI report. Therefore, in (a), the target PUSCH resource is indicated by the downlink grant.

In an implementation, the first downlink grant indicates, by indicating identification information corresponding to the PUSCH resource, the PUSCH resource used to transmit the CSI report.

For example, it is assumed that the PUSCH resource that is used to transmit the CSI report includes a PUSCH resource 1 and a PUSCH resource 2, identification information corresponding to the PUSCH resource 1 is identification information 1, and identification information corresponding to the PUSCH resource 2 is identification information 2. Then, if the first downlink grant indicates the identification information 1, the terminal may send the CSI report on the PUSCH resource 1.

In (a), the first downlink grant not only may be used to trigger the reporting of the CSI, but also may be used to indicate the PUSCH resource that is used to transmit the CSI report. That is, the downlink grant used to trigger the reporting of the CSI is the same as the downlink grant used to indicate the PUSCH resource that is used to transmit the CSI report. However, it may be understood that, in other implementations, the downlink grant used to trigger the reporting of the CSI may be different from the downlink grant used to indicate the PUSCH resource that is used to transmit the CSI report. This can be determined according to an actual situation, and is not limited in this embodiment of this application.

In (b), the target PUSCH resource is determined based on the CSI report that trigger and reported by the downlink grant. In an implementation, the downlink grant may trigger reporting of a plurality of CSI reports, the plurality of CSI reports are associated with the PUSCH resource. In this association relationship, one PUSCH resource may be associated with one or more CSI reports.

For example, it is assumed that a downlink grant 1 is used to trigger reporting of a CSI report 1 and a CSI report 2, the CSI report 1 is associated with the PUSCH resource 1, and the CSI report 2 is associated with the PUSCH resource 2.

Then, after receiving the downlink grant 1, the terminal sends the CSI report 1 on the PUSCH resource 1 and sends the CSI report 2 on the PUSCH resource 2.

In (c), the target PUSCH resource is determined by the terminal based on a magnitude of load of the reported CSI report. For example, it is assumed that a magnitude of load of the CSI report 1 is located in a first interval and a PUSCH resource corresponding to the first interval is the PUSCH Resource 1. The terminal sends the CSI Report 1 on the PUSCH Resource 1.

In this embodiment of this application, the CSI report sent by the terminal may include at least one of the following: a Channel Quality indicator ((CQI); a Preceding Matrix Indicator (PMI); a Rank Indicator (RI); or a CSI-RS Resource Indicator (CRI).

For example, a channel quality indicator CQI included in the CSI report includes at least one of the following: N CQIs with largest values in R CQIs, a variance of the R CQIs, or M CQIs with smallest values in the R CQIs; and the CQI is a CQI of a subband, R is equal to a quantity of subbands, and both N and M are positive integers less than or equal to R. The CQI included in the CSI report may be a mean value of the R CQIs. It may be learned that, in this embodiment of this application, flexibility and richness of the CQI included in the CSI report are improved.

FIG. 4 is a flowchart of a channel information receiving method according to an embodiment of this application. The channel information receiving method in this embodiment of this application is performed by a network side device.

As shown in FIG. 4, the channel information receiving method may include the following steps.

Step 401: A network side device sends a first downlink grant, where the first downlink grant is used to indicate reporting of CSI.

Step 402: The network side device receives a CSI report on a target PUSCH resource.

According to the channel information receiving method in this embodiment of this application, the network side device may send the first downlink grant to indicate the reporting of the CSI, and receive the CSI report on the target PUSCH resource in response to this downlink grant. In this way, when scheduling downlink data transmission, the network side device may trigger a terminal to report the CSI report by the first downlink grant, so that when downlink signaling overhead is saved, channel information is updated in time and reliability of data transmission is improved.

For example, a transmission parameter of the target PDSCH resource is determined by at least one of the following: first downlink grant indication, radio resource control RRC signaling configuration, or predefinition in a protocol.

For example, a time domain resource of the target PUSCH resource is determined based on a first time domain resource, the first time domain resource is determined based on P reference moments and Q time domain offsets, and P and Q are positive integers.

The Q time domain offsets are determined by at least one of the following: first downlink grant indication; RRC signaling configuration; or the predefinition in a protocol.

For example, the Q time domain offsets are determined based on a processing time.

The processing time is: a time for which the CSI is processed; or a time for which a physical downlink shared channel PDSCH is processed.

For example, the P reference moments include at least one of the following:

a moment at which the first downlink grant is received;

a moment at which hybrid automatic repeat request HARQ feedback information is transmitted, where the HARQ feedback information is HARQ feedback information corresponding to a PDSCH of first downlink grant scheduling; or a moment at which a first reference signal is received, where the first reference signal is a reference signal corresponding to the CSI report.

For example, the first time domain resource is determined when at least one of the following is satisfied:

the first time domain resource is located after a first reference moment, and there is a first time domain offset between the first time domain resource and the first reference moment, the first reference moment is a last reference moment of T reference moments after being sequentially arranged in chronological order, and the first time domain offset is a largest time domain offset in S time domain offsets, or a sum of the S time domain offsets;

the first time domain resource is a last time domain resource after L time domain resources are sequentially arranged in chronological order, each time domain resource in the L time domain resources is determined based on at least one reference moment in the T reference moments and at least one time domain offset in the S time domain offsets, and reference moments and/or time domain offsets corresponding to different time domain resources are different; or the T reference moments are reference moments in the P reference moments, and T is a positive integer less than or equal to P. The S time domain offsets are S time domain offsets in the Q time domain offsets, S is a positive integer less than or equal to Q, and L is an integer greater than or equal to S or T.

For example, the time domain resource of the target PUSCH resource is the first available uplink time domain resource after the first time domain resource.

For example, the target PUSCH resource is any one of the following:

a PUSCH resource corresponding to identification information of first downlink grant indication;

a PUSCH resource associated with the CSI report; or a PUSCH resource determined by the terminal based on a magnitude of load of the CSI report.

For example, a CQI included in the CSI report includes at least one of the following: N CQIs with largest values in R CQIs, a variance of the R CQIs, or M CQIs with smallest values in the R CQIs.

The CQI is a CQI of a subband, R is equal to a quantity of subbands, and both N and M are positive integers less than or equal to R.

It should be noted that this embodiment is an embodiment of the network side device corresponding to the foregoing method embodiment in FIG. 2. Therefore, reference may be made to the related description in the method embodiment shown in FIG. 2, and a same effect is achieved. To avoid repetition of description, details are not described herein again.

The plurality of implementations described in this embodiment of this application may be implemented in combination with each other or may be implemented separately. This is not limited in this embodiment of this application.

For ease of understanding, example descriptions are as follows:

A network is configured with the PUSCH resource for the reporting of the CSI. The PUSCH resource is a semi-statically configured PUSCH resource. When the terminal receives a grant, the terminal triggers the reporting of the CSI based on indication of the DL grant. After receiving the DL grant to trigger the reporting of the CSI, UE triggers transmission of the reporting of the CSI on a corresponding PUSCH resource.

(1) For example, the PUSCH resource includes at least one or more of the following transmission parameters: time domain resource allocation; frequency domain resource allocation (also includes ail RBG size); a frequency domain hopping parameter, including a hopping mode and a hopping offset; a DMRS configuration/parameter (also includes a DMRS sequence initialization parameter); a precoder and a quantity of layers; an SRS resource indicator; a number of an antenna port; an MCS; an uplink transmission waveform; a Beta-offset; an open-loop power control parameter, P0 and/or alpha; a closed-loop power control parameter; an HARQ process number and/or a quantity of HARQ processes; a RV; and a quantity of repetitions.

(2) The transmission parameter of the PUSCH resource is determined by at least one or more of the following: the DL grant indication; the RRC configuration; or the predefinition in a protocol.

(3) The PUSCH resource may be one or more PUSCH resources.

If there are a plurality of PUSCH resources, the UE selects the target PUSCH resource in a following manner:

1. The target PUSCH resource is indicated based on the DL grant indication.

For example, each PUSCH resource is configured with an index number, and the DL grant indication indicates an index of the PUSCH resource.

2. The target PUSCH resource is determined by a PUSCH associated with the CSI report triggered by the DL grant.

For example, each CSI report i is associated with a PUSCH resource k, and this association is configured or predefined by the network. The DL grant indicates a triggered CSI report i, and determines the PUSCH resource based on a PUSCH resource corresponding to the CSI report i.

3. The target PUSCH resource is determined based on the UE based on a magnitude of load of the CSI.

If a CSI part 2 is included, it is assumed that a rank is equal to 1.

(4) A PUSCH time domain resource in (1) includes at least one of the following: a start location, a length of a time domain resource, a quantity of time domain transmission opportunities, or an end location. The time domain resource may be determined based on a first moment (for example, the foregoing reference moment) and the time domain offset.

The time domain offset includes at least one of the following:

an offset 1 indicated by the DL grant; an offset 2 configured by an RRC; or an offset 3 predefined in a protocol.

For example, the offset 3 may be determined based on the processing time, for example, an offset 3_1 determined based on a time Z for which the CSI is calculated, or an offset 3_2 determined based on a processing time N1 of the PDSCH.

It should be noted that the time domain offset may be 0.

The first moment may include at least one of the following:

a moment t1 at which the DL grant is received; a moment t2 at which an HARQ-ACK is transmitted and that is scheduled by the DL grant; and a moment t3 at which a CSI-RS is received.

There may be one or more time domain offsets, and there may be one or more first moments.

In a case that there is one time domain offset and one first moment, the time domain resource may be determined based on the first moment+the time domain offset.

In a case that there are a plurality of time domain offsets and one first moment:

Option 1: The time domain resource is determined based on a first moment+max (a time domain offset 1, a time domain offset 2, . . . ); or Option 2: The time domain resource is determined according to the first moment (a time domain offset 1+a time domain offset 2, . . . ) to determine.

In a case that there is one the time domain offset and a plurality of first moments, the time domain resource is determined based on a latest time domain location in {a first moment 1+a time domain offset, a first moment 2+a time domain offset, . . . }.

In a case that there is a plurality of time domain offsets and a plurality of first moments, the time domain resource is determined based on a latest time domain location in {a first moment 1+a time domain offset 1, a first moment 2+a time domain offset 2, . . . }.

For example, the PUSCH time domain resource is a first available uplink resource (a slot/a subslot/a symbol) after a time domain location determined in the foregoing manner (inclusive). This uplink resource is an available uplink resource determined based on a semi-static TDD or the RRC configuration.

For example, the PUSCH time domain resource is a time domain location determined based on t1+offset1;

the PUSCH time-domain resource is a time domain location determined based on t1+offset1+offset2;

the PUSCH time domain resource is a time domain location determined based on the later in {t1+offset1, t3+offset3};

the PUSCH time domain resource is a time domain position determined based on t1+offset1+d, where d is an interval between the time domain location determined based on t1+offset1 and the first available uplink resource.

For example, after receiving the DL grant to trigger the reporting of the CSI, the UE triggers the transmission of the reporting of the CSI on the corresponding PUSCH resource. The reporting of the CSI includes one or more of the following: a CQI; a PMI; a RI; or a CRI.

The CQI may be any one of the following: a best N CQIs; a mean value of CQIs; a variance of CQIs; or a worst M CQI.

For example, the UE, on the corresponding PUSCH resource, may also include at least one of the following: an HARQ-ACK and uplink data.

Embodiment 1

If a PUSCH resource that is used to transmit the CSI is configured by the network, the configuration information includes one or more of the following transmission parameters (the PUSCH resource is similar to the semi-statically configured PUSCH resource):

time domain resource allocation; frequency domain resource allocation; a frequency domain hopping parameter, including a hopping mode and a hopping offset; a DMRS configuration/parameter; a precoder and a quantity of layers; an SRS resource indicator; a number of an antenna port; an MCS; an uplink transmission waveform; a Beta-offset; an open-loop power control parameter, P0 and/or alpha; a closed-loop power control parameter; an HARQ process number and/or a quantity of HARQ processes; a RV; and a quantity of repetitions.

When receiving the DL grant, the terminal triggers the reporting of the CSI based on indication of the DL grant, and indicates the UE to send the reporting of the CSI on the PUSCH resource configured by the network.

In this example, the DL grant is only used to trigger the reporting of the CSI and does not indicate the parameter of the PUSCH resource. The parameter of the PUSCH resource may be configured by the RRC.

Embodiment 2

If the PUSCH resource that is used to transmit the CSI is configured by the network, the configuration information includes one or more of the following transmission parameters (the PUSCH resource is similar to the semi-statically configured PUSCH resource):

frequency domain resource allocation; a frequency domain hopping parameter, including a hopping mode and a hopping offset; a DMRS configuration/parameter; a precoder and a quantity of layers; an SRS resource indicator; a number of an antenna port; an MCS; an uplink transmission waveform; a Beta-offset; an open-loop power control parameter, P0 and/or alpha; a closed-loop power control parameter; an HARQ process number and/or a quantity of HARQ processes; a RV; and a quantity of repetitions.

When receiving the DL grant, the terminal triggers the reporting of the CSI based on indication of the DL grant, and indicates the UE to send the reporting of the CSI on the PUSCH resource configured by the network.

In this example, the DL grant is used to trigger the reporting of the CSI and further indicates a time domain parameter of the PUSCH resource. For example; the DL grant indicates a time domain offset relative to a moment at which an HARQ-ACK is transmitted and that is scheduled by the DL grant, a time domain resource location of PUSCH carrying the reporting of the CSI is determined based on the domain offset. Another parameter of the PUSCH resource may be configured by the RRC.

Embodiment 3

If a plurality of PUSCH resources that are used to transmit the CSI are configured by the network, each piece of PUSCH configuration information includes one or more of the following transmission parameters (the PUSCH resource is similar to the semi-statically configured PUSCH resource):

frequency domain resource allocation; a frequency domain hopping parameter, including a hopping mode and a hopping offset; a DMRS configuration/parameter; a precoder and a quantity of layers; an SRS resource indicator; a number of an antenna port; an MCS; an uplink transmission waveform; a Beta-offset; an open-loop power control parameter, P0 and/or alpha; a closed-loop power control parameter; an HARQ process number and/or a quantity of HARQ processes; a RV; and a quantity of repetitions.

When receiving the DL grant, the terminal triggers the reporting of the CSI based on indication of the DL grant, and indicates the UE to send the reporting of the CSI on one PUSCH resource configured by the network.

In this example, the DL grant is used to trigger the reporting of the CSI and indicates the target PUSCH resource.

The target PUSCH resource may be determined by a PUSCH that is associated with the CSI report and triggered by the DL grant. For example, each CSI report i is associated with a PUSCH resource k, and this association is configured by the network. The DL grant indicates the triggered CSI report i, and determines the PUSCH resource based on the PUSCH resource corresponding to the CSI report i.

The transmission parameter of the target PUSCH resource may be configured by the RRC.

This embodiment of this application may be applicable to a single-carrier, a multi-carrier, an authorized frequency band, or an unauthorized frequency band.

In this embodiment of this application, when the downlink grant is scheduled, reporting of an aperiodic CSI is triggered and channel information is updated in a timely manner. This avoids increase of overhead of downlink signaling.

It should be noted that, the channel information sending method provided in this embodiment of this application may be performed by a channel information sending apparatus, or by a control module that is in the channel information sending apparatus and that is configured to perform the channel information sending method. In this embodiment of this application, that the channel information sending apparatus performs the channel information sending method is used as an example to describe the channel information sending apparatus provided in an embodiment of this application.

Figure 5:
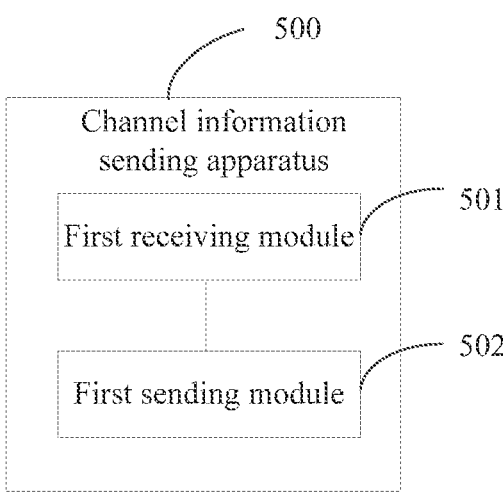
FIG. 5 is a schematic diagram of a structure of a channel information sending apparatus according to an embodiment of this application.

FIG. 5 is a schematic diagram of a structure of a channel information sending apparatus according to an embodiment of this application.

As shown in FIG. 5, the channel information sending apparatus 500 includes:

a first receiving module 501, configured to receive, by a terminal, a first downlink grant, where the first downlink grant is used to indicate reporting of channel state information CSI; and a first sending module 502, configured to send, by the terminal, a CSI report on a target physical uplink shared channel PUSCH resource.

For example, a transmission parameter of the target PUSCH resource is determined by at least one of the following: first downlink grant indication, radio resource control RRC signaling configuration, or predefinition in a protocol.

For example, a time domain resource of the target PUSCH resource is determined based on a first time domain resource, the first time domain resource is determined based on P reference moments and Q time domain offsets, and P and Q are positive integers.

The Q time domain offsets are determined by at least one of the following: first downlink grant indication; RRC signaling configuration; or the predefinition in a protocol.

For example, the Q time domain offsets are determined based on processing time.

The processing time is: a time for which the CSI is processed; or a time for which a physical downlink shared channel PDSCH is processed.

For example, the P reference moments include at least one of the following:

a moment at which the first downlink grant is received;

a moment at which hybrid automatic repeat request HARQ feedback information is transmitted, where the HARQ feedback information is HARQ feedback information corresponding to a PDSCH of first downlink grant scheduling; or a moment at which a first reference signal is received, where the first reference signal is a reference signal corresponding to the CSI report.

For example, the first time domain resource is determined when at least one of the following is satisfied:

the first time domain resource is located after a first reference moment, and there is a first time domain offset between the first time domain resource and the first reference moment, the first reference moment is a last reference moment of T reference moments after being sequentially, arranged in chronological order, and the first time domain offset is a largest time domain offset in S time domain offsets, or a sum of the S time domain offsets;

the first time domain resource is a last time domain resource after L time domain resources are sequentially arranged in chronological order, each time domain resource in the L time domain resources is determined based on at least one reference moment in the T reference moments and at least one time domain offset in the S time domain offsets, and reference moments and/or time domain offsets corresponding to different time domain resources are different; or the T reference moments are T reference moments in the P reference moments, and T is a positive integer less than or equal to P. The S time domain offsets are S time domain offsets in the Q time domain offsets, S is a positive integer less than or equal to Q, and L is an integer greater than or equal to S or T.

For example, the time domain resource of the target PUSCH resource is the first available uplink time domain resource after the first time domain resource.

For example, the target PUSCH resource is any one of the following:

a PUSCH resource corresponding to identification information of first downlink grant indication;

a PUSCH resource associated with the CST report; or a PUSCH resource determined by the terminal based on a magnitude of load of the CSI report.

For example, a channel quality indicator CQI included in the CSI report includes at least one of the following: N CQIs with largest values in R CQIs, a variance of the R CQIs, or M CQIs with smallest values in the R CQIs.

The CQI is a CQI of a subband, R is equal to a quantity of subbands, and both N and M are positive integers less than or equal to R.

The channel information receiving apparatus in this embodiment of this application may be an apparatus, or may be a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a Network Attached Storage (NAS), a Personal Computer (PC), a Television (TV), a teller machine, or a self-service machine. This is not specifically limited in this embodiment of this application.

The channel information receiving apparatus in this embodiment of this application may be an apparatus with an operating system. The operating system may be an Android operating system, may be an iOS operating system, or may be another possible operating system. This is not specifically limited in this embodiment of this application.

The channel information sending apparatus 500 provided in this embodiment of this application may implement each process implemented in the method embodiment of FIG. 2, and a same technical effect is achieved. To avoid repetition, details are not described herein again.

It should be noted that, the channel information receiving method provided in this embodiment of this application may be performed by a channel information receiving apparatus, or by a control module that is in the channel information receiving apparatus and that is configured to perform the channel information receiving method. In this embodiment of this application, that the channel information receiving apparatus performs the channel information receiving method is used as an example to describe the channel information receiving apparatus provided in an embodiment of this application.

Figure 6:
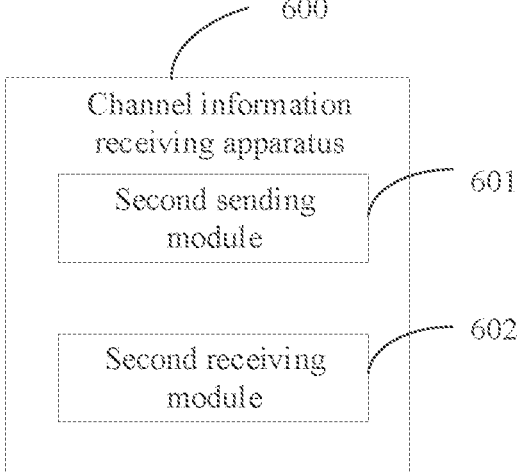
FIG. 6 is a schematic diagram of a structure of a channel information receiving apparatus according to an embodiment of this application.

FIG. 6 is a schematic diagram of a structure of a channel information receiving apparatus according to an embodiment of this application.

As shown in FIG. 6, a channel information receiving apparatus 600 includes:

a second sending module 601, configured to send, by a network side device, a first downlink grant, where the first downlink grant is used to indicate reporting of CSI; and a second receiving module 602, configured to receive, by the network side device, a CSI report on a target PUSCH resource.

For example, a transmission parameter of the target PUSCH resource is determined by at least one of the following: first downlink grant indication, radio resource control RRC signaling configuration, or predefinition in a protocol.

For example, a time domain resource of the target PUSCH resource is determined based on a first time domain resource, the first time domain resource is determined based on P reference moments and Q time domain offsets, and P and Q are positive integers.

The Q time domain offsets are determined by at least one of the following: first downlink grant indication; RRC signaling configuration; or the predefinition in a protocol.

For example, the Q time domain offsets are determined based on processing time.

The processing time is: a time for which the CSI is processed; or a time for which a physical downlink shared channel PDSCH is processed.

For example, the P reference moments include at least one of the following:

a moment at which the first downlink grant is received;

a moment of hybrid automatic repeat request HARQ feedback information is transmitted, where the HARQ feedback information is HARQ feedback information corresponding to a PDSCH of first downlink grant scheduling; or a moment at which a first reference signal is received, where the first reference signal is a reference signal corresponding to the CSI report.

For example, the first time domain resource is determined when at least one of the following is satisfied:

the first time domain resource is located after a first reference moment, and there is a first time domain offset between the first time domain resource and the first reference moment, the first reference moment is a last reference moment of T reference moments after being sequentially arranged in chronological order, and the first time domain offset is a largest time domain offset in S time domain offsets, or a sum of the S time domain offsets;

the first time domain resource is a last time domain resource after L time domain resources are sequentially arranged in chronological order, each time domain resource in the L time domain resources is determined based on at least one reference moment in the T reference moments and at least one time domain offset in the S time domain offsets, and reference moments and/or time domain offsets corresponding to different time domain resources are different; or the T reference moments are T reference moments in the P reference moments, and T is a positive integer less than or equal to P. The S time domain offsets are S time domain offsets in the Q time domain offsets, S is a positive integer less than or equal to Q, and L is an integer greater than or equal to S or T.

For example, the time domain resource of the target PUSCH resource is the first available uplink time domain resource after the first time domain resource.

For example, the target PUSCH resource is any one of the following:

a PUSCH resource corresponding to identification information of first downlink grant indication;

a PUSCH resource associated with the CSI report; or a PUSCH resource determined by the terminal based on a magnitude of load of the CSI report.

For example, a CQI included in the CSI report includes at least one of the following: N CQIs with largest values in R CQIs, a variance of the R CQIs, or M CQIs with smallest values in the R CQIs.

The CQI is a CQI of a subband, R is equal to a quantity of subbands, and both N and M are positive integers less than or equal to R.

The channel information receiving apparatus in this embodiment of this application may be an apparatus, or may be a component, an integrated circuit, or a chip in a network side device. The network side device may include, but is not limited to, the types of network side device 12 listed above, which is not specifically limited in this embodiment of this application.

The channel information receiving apparatus 600 provided in this embodiment of this application may implement each process implemented in the method embodiment of FIG. 4, and a same technical effect is achieved. To avoid repetition, details are not described herein again.

Figure 7:
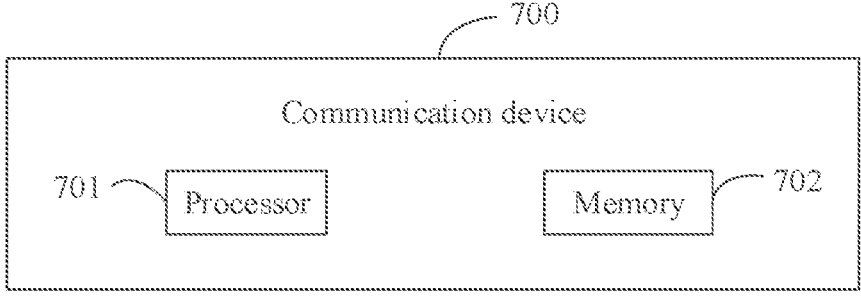
FIG. 7 is a structural diagram of a communication device according to an embodiment of this application.

For example, as shown in FIG. 7, an embodiment of this application further provides a communication device 700, including a processor 701, a memory 702, and a program or instructions stored in the memory 702 and capable of running on the processor 701. For example, in a case that the communication device 700 is a terminal, when the program or the instructions are executed by the processor 701, each process of the method embodiment in FIG. 2 is implemented, and a same technical effect is achieved. In a case that the communication device 700 is a network side device, when the program or the instructions are executed by the processor 701, each process of the method embodiment in FIG. 4 is implemented, and a same technical effect is achieved. To avoid repetition, details are not described herein again.

Figure 8:
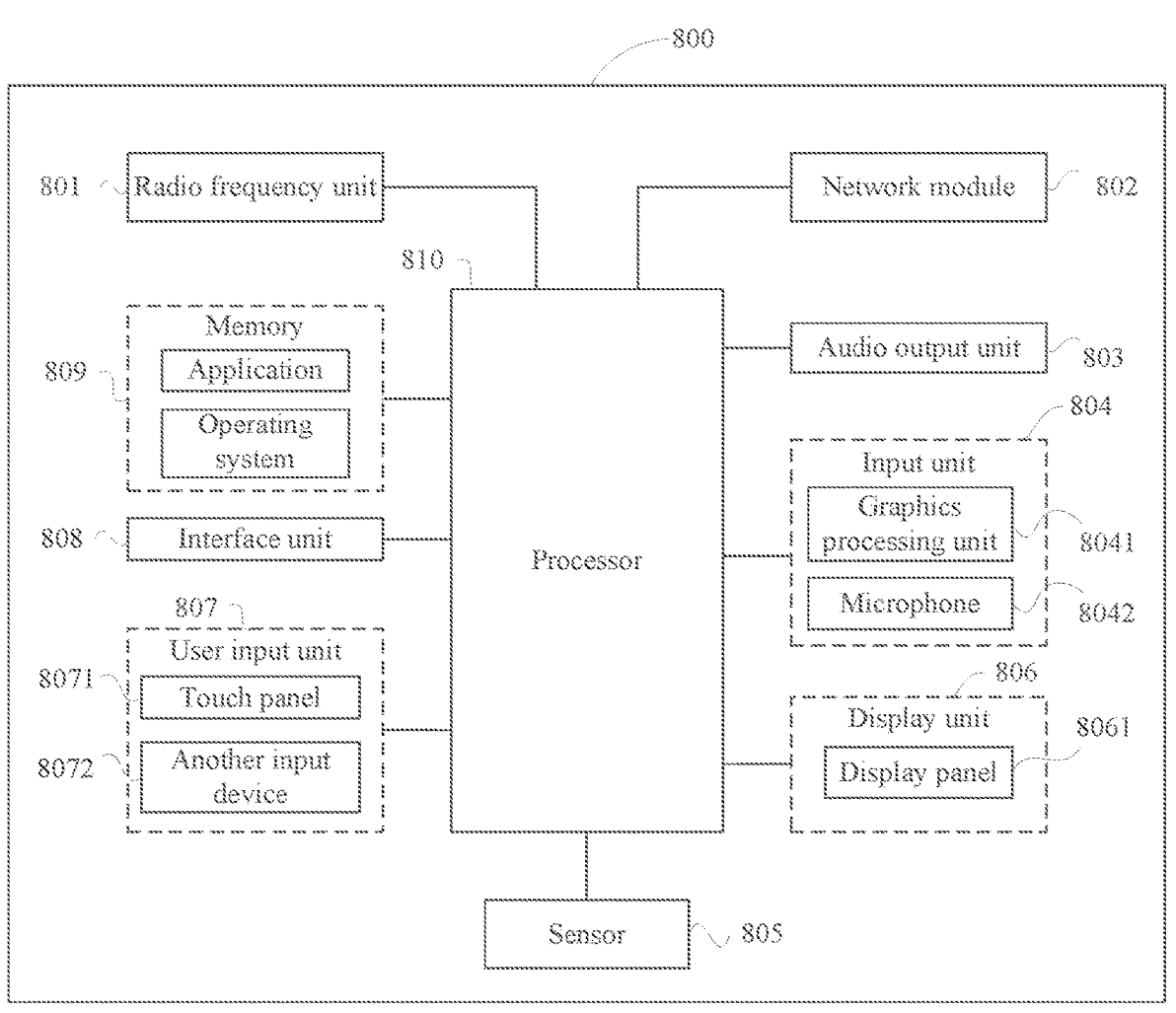
FIG. 8 is a structural diagram of a terminal according to an embodiment of this application.

FIG. 8 is a schematic diagram of a hardware structure of a terminal according to an embodiment of this application.

A terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the terminal 800 may further include a power supply (such as a battery) that supplies power to each component. The power supply may be logically connected to the processor 810 by using a power supply management system, to implement functions such as charging and discharging management, and power consumption management by using the power supply management system. The terminal structure shown in FIG. 8 constitutes no limitation on the terminal, and the terminal may include more or fewer components than those shown in the figure, or combine some components, or have different component arrangements. Details are not described herein.

It should be understood that, in this embodiment of this application, the input unit 804 may include a Graphics Processing Unit (GPU) 8041 and a microphone 8042, and the graphics processing unit 8041 processes image data of a still picture or a video obtained by an image capture apparatus (such as a camera) in a video capture mode or an image capture mode. The display unit 806 may include a display panel 8061, and the display panel 8061 may be configured in a form of a liquid crystal display, an organic light emitting diode, or the like. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

In this embodiment of this application, the radio frequency unit 801 receives downlink data from a network side device and then sends the downlink data to the processor 810 for processing; and sends uplink data to the network side device. Usually, the radio frequency unit 801 includes but is not limited to an antenna, at least one amplifier, a transceiver, a coupler, a low noise amplifier, a duplexer, and the like.

The memory 809 may be configured to store a software program or instructions and various data. The memory 809 may mainly include a storage area of a program or instructions and a data storage area. The storage area of the program or the instructions may store an operating system, and an application program or instructions required by at least one function (for example, a sound playing function or an image playing function). In addition, the memory 809 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage device, a flash memory device; or another non-volatile solid-state storage device.

The processor 810 may include one or more processing units. For example, the processor 810 may integrate an application processor and a modem processor. The application processor mainly processes an operating system, a user interface, an application program, instructions, and the like. The modem processor mainly processes wireless communication, such as a baseband processor. It may be understood that the modem processor may be not integrated in the processor 810.

The radio frequency unit 801 is configured to:

A terminal receives a first downlink grant, where the first downlink grant is used to indicate reporting of channel state information CSI.

The terminal sends a CSI report on a target physical uplink shared channel PUSCH resource.

For example, a transmission parameter of the target PDSCH resource is determined by at least one of the following: first downlink grant indication, radio resource control RRC signaling configuration, or predefinition in a protocol.

For example, a time domain resource of the target PUSCH resource is determined based on a first time domain resource, the first time domain resource is determined based on P reference moments and Q time domain offsets, and P and Q are positive integers.

The Q time domain offsets are determined by at least one of the following: first downlink grant indication; RRC signaling configuration; or the predefinition in a protocol.

For example, the Q time domain offsets are determined based on processing time.

The processing time is: a time for which the CSI is processed; or a time for which a physical downlink shared channel PDSCH is processed.

For example, the P reference moments include at least one of the following:

a moment at which the first downlink grant is received;

a moment at which hybrid automatic repeat request HARQ feedback information is transmitted, where the HARQ feedback information is HARQ feedback information corresponding to a PDSCH of first downlink grant scheduling; or a moment at which a first reference signal is received, where the first reference signal is a reference signal corresponding to the CSI report.

For example, the first time domain resource is determined when at least one of the following is satisfied:

the first time domain resource is located after a first reference moment, and there is a first time domain offset between the first time domain resource and the first reference moment, the first reference moment is a last reference moment of T reference moments after being sequentially arranged in chronological order, and the first time domain offset is a largest time domain offset in S time domain offsets, or a sum of the S time domain offsets;

the first time domain resource is a last time domain resource after L time domain resources are sequentially arranged in chronological order, each time domain resource in the L time domain resources is determined based on at least one reference moment in the T reference moments and at least one time domain offset in the S time domain offsets, and reference moments and/or time domain offsets corresponding to different time domain resources are different; or the T reference moments are reference moments in the P reference moments, and T is a positive integer less than or equal to P. The S time domain offsets are S time domain offsets in the Q time domain offsets, S is a positive integer less than or equal to Q, and L is an integer greater than or equal to S or T.

For example, the time domain resource of the target PUSCH resource is the first available uplink time domain resource after the first time domain resource.

For example, the target PUSCH resource is any one of the following:

a PUSCH resource corresponding to identification information of first downlink grant indication;

a PUSCH resource associated with the CSI report; or a PUSCH resource determined by the terminal based on a magnitude of load of the CSI report.

For example, a channel quality indicator CQI included in the CSI report includes at least one of the following: N CQIs with largest values in R CQIs, a variance of the R CQIs, or M CQIs with smallest values in the R CQIs.

The CQI is a CQI of a subband, R is equal to a quantity of subbands, and both N and M are positive integers less than or equal to R.

It should be noted that the terminal 800 in this embodiment may implement each process in the method embodiment of FIG. 2 in embodiments of this application, and a same effect is achieved. To avoid repetition, details are not described herein again.

Figure 9:
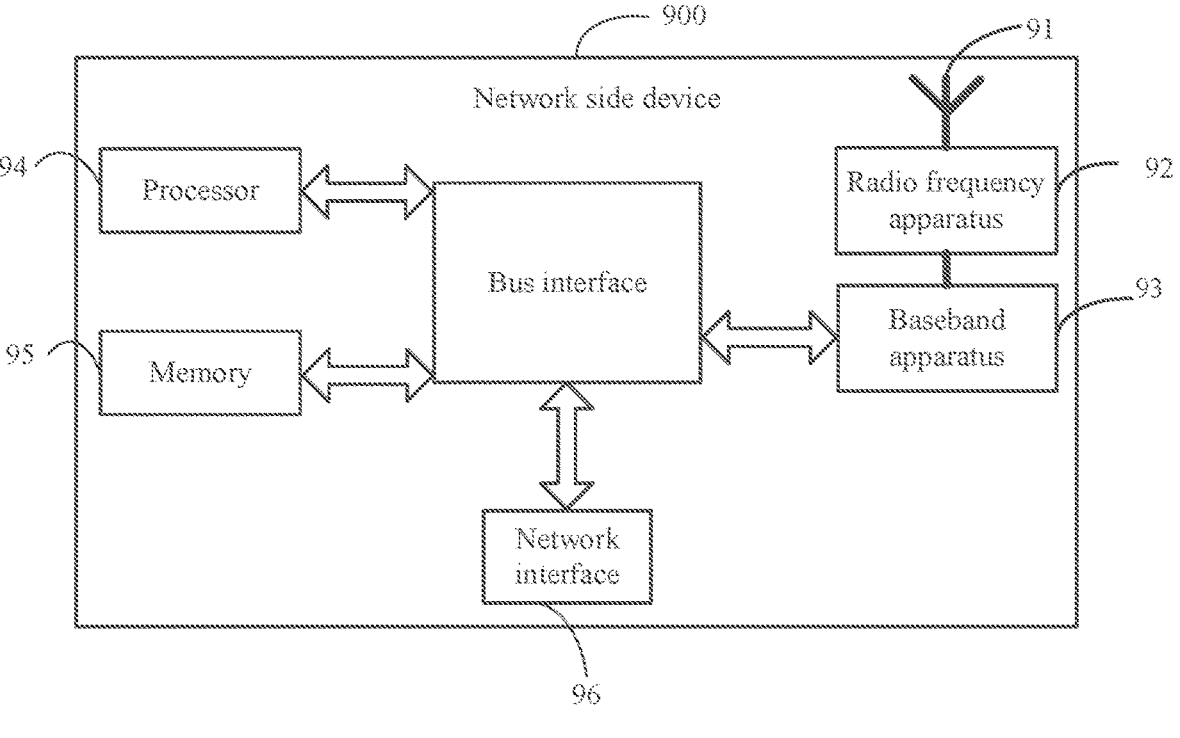
FIG. 9 is a diagram of a structure of a network side device according to an embodiment of this application.

For example, an embodiment of this application further provides a network side device. As shown in FIG. 9, a network side device 900 includes an antenna 91, a radio frequency apparatus 92, and a baseband apparatus 93. The antenna 91 is connected to the radio frequency apparatus 92. In an uplink direction, the radio frequency apparatus 92 receives information through the antenna 91, and sends the received information to the baseband apparatus 93 for processing. In a downlink direction, the baseband apparatus 93 processes information to be sent and sends the information to the radio frequency apparatus 92, and the radio frequency apparatus 92 processes the received information and sends the information through the antenna 91.

The frequency band processing apparatus may be located in the baseband apparatus 93. The method performed by the network side device 900 in the foregoing embodiment may be implemented in the baseband apparatus 93. The baseband apparatus 93 includes a processor 94 and a memory 95.

The baseband apparatus 93 may include, for example, at least one baseband board. A plurality of chips are disposed on the baseband board. As shown in FIG. 9, one chip is, for example, the processor 94, connected to the memory 95, to invoke a program in the memory 95, thereby performing operations of the network device shown in the foregoing method embodiment.

The baseband apparatus 93 may further include a network interface 96, configured to exchange information with the radio frequency apparatus 92. For example, the interface is a Common Public Radio interface (CPRI).

For example, the network side device in this embodiment of this application further includes instructions or a program stored in the memory 95 and capable of running on the processor 94. The processor 94 invokes the instructions or the program in the memory 95 to perform each process of the method embodiment in FIG. 4, and a same technical effect is achieved. To avoid repetition, details are not described herein again.

An embodiment of the present application further provides a computer-readable storage medium. The computer-readable storage medium stores a computer program, and when a processor executes the computer program, each process in the method embodiment in FIG. 2 or FIG. 4 is implemented, and a same technical effect is achieved. To avoid repetition, details are not described herein. The computer-readable storage medium may be a ROM, a Random Access Memory (RAM), a magnetic disk, a compact disc, or the like.

An embodiment of this application further provides a readable storage medium. The readable storage medium stores a program or instructions. When the program or the instructions are executed by a processor, each process in the method embodiment in FIG. 2 or FIG. 4 is implemented, and a same technical effect is achieved. To avoid repetition, details are not described herein again.

The processor is a processor in the terminal in the foregoing embodiment. The readable storage medium includes a computer-readable storage medium, such as a ROM, an RAM, a magnetic disk, or an optical disc.

An embodiment of this application further provides a chip. The chip includes a processor and a communication interface. The communication interface is coupled to the processor, and when the processor is configured to run a program or instructions of a network side device, each process of the method embodiment in FIG. 2 or FIG. 4 is implemented, and a same technical effect is achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product is stored in a non-volatile storage medium, and when the computer program product is executed by at least one processor, each process in the method embodiment in FIG. 2 or FIG. 4 is implemented, and a same technical effect is achieved. To avoid repetition, details are not described herein again.

An embodiment of this application provides a communication device, configured to perform each process in the foregoing method embodiment in FIG. 2 or FIG. 4, and a same technical effect is achieved. To avoid repetition, details are not described herein again.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, exclude the presence of additional identical elements in the process, method, article, or apparatus that includes the element. In addition, it should be noted that a scope of the method and the apparatus in the implementations of this application is not limited to: performing functions in a sequence shown or discussed, and may further include: performing functions in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. In some embodiment, the technical solutions of this application entirely or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in embodiments of this application.

Embodiments of this application are described above with reference to the accompanying drawings, but this application is not limited to the foregoing implementations. The foregoing embodiments are only illustrative rather than restrictive. Inspired by this application, a person of ordinary skill in the art can still derive many variations without departing from the essence of this application and the protection scope of the claims. All these variations shall fall within the protection of this application.

The invention claimed is:

1. A channel information sending method, comprising:

receiving, by a terminal, a first downlink grant, wherein the first downlink grant is used to indicate reporting of Channel State Information (CSI); and sending, by the terminal, a CSI report on a target Physical Uplink Shared Channel (PUSCH) resource, wherein: a time domain resource of the target PUSCH resource is determined based on a first time domain resource determined based on P reference time moments and Q time domain offsets, and the Q time domain offsets are determined by at least one of the following: first downlink grant indication, Radio Resource Control (RRC) signaling configuration, or predefinition in a protocol, wherein P and Q are positive integers, wherein the first time domain resource is determined when at least one of the following is satisfied:

the first time domain resource is located after a first reference time moment, and there is a first time domain offset between the first time domain resource and the first reference time moment, the first reference time moment is a last reference time moment of T reference time moments after being sequentially arranged in chronological order, and the first time domain offset is a largest time domain offset in S time domain offsets, or a sum of the S time domain offsets, or the first time domain resource is a last time domain resource of L time domain resources after being sequentially arranged in chronological order, each time domain resource in the L time domain resources is determined based on at least one reference time moment in the T reference time moments and at least one time domain offset in the S time domain offsets, and reference time moments or time domain offsets corresponding to different time domain resources are different, wherein:

the T reference time moments are T reference time moments in the P reference time moments, and T is a positive integer less than or equal to P; and the S time domain offsets are S time domain offsets in the Q time domain offsets, S is a positive integer less than or equal to Q, and L is an integer greater than or equal to S or T.

2. The channel information sending method according to claim 1, wherein a transmission parameter of the target PUSCH resource is determined by at least one of the following: the first downlink grant indication, the RRC signaling configuration, or the predefinition in the protocol.

3. The channel information sending method according to claim 1, wherein the Q time domain offsets are determined based on a processing time, and the processing time is: a time for which the CSI is calculated, or a time for which a Physical Downlink Shared Channel (PDSCH) is processed.

4. The channel information sending method according to claim 1, wherein the P reference time moments comprise at least one of the following:

a time moment at which the first downlink grant is received, a time moment at which Hybrid Automatic Repeat Request (HARQ) feedback information is transmitted, wherein the HARQ feedback information is HARQ feedback information corresponding to a Physical Downlink Shared Channel (PDSCH) of first downlink grant scheduling, or a time moment at which a first reference signal is received, wherein the first reference signal is a reference signal corresponding to the CSI report.

5. The channel information sending method according to claim 1, wherein the time domain resource of the target PUSCH resource is the first available uplink time domain resource after the first time domain resource.

6. The channel information sending method according to claim 1, wherein the target PUSCH resource is any one of the following:

a PUSCH resource corresponding to identification information of first downlink grant indication, a PUSCH resource associated with the CSI report, or a PUSCH resource determined by the terminal based on a magnitude of load of the CSI report.

7. The channel information sending method according to claim 1, wherein a Channel Quality Indicator (CQI) comprised in the CSI report comprises at least one of the following: N CQIs with largest values in R CQIs, a variance of the R CQIs, or M CQIs with smallest values in the R CQIs, and the CQI is a CQI of a subband, R is equal to a quantity of subbands, and both N and M are positive integers less than or equal to R.

8. A channel information receiving method, comprising:

sending, by a network side device, a first downlink grant, wherein the first downlink grant is used to indicate reporting of Channel State Information (CSI), and receiving, by the network side device, a CSI report on a target Physical Uplink Shared Channel (PUSCH) resource, wherein a time domain resource of the target PUSCH resource is determined based on a first time domain resource determined based on P reference time moments and Q time domain offsets, and the Q time domain offsets are determined by at least one of the following: first downlink grant indication, Radio Resource Control (RRC) signaling configuration, or predefinition in a protocol, wherein P and Q are positive integers, wherein the first time domain resource is determined when at least one of the following is satisfied:

the first time domain resource is located after a first reference time moment, and there is a first time domain offset between the first time domain resource and the first reference time moment, the first reference time moment is a last reference time moment of T reference time moments after being sequentially arranged in chronological order, and the first time domain offset is a largest time domain offset in S time domain offsets, or a sum of the S time domain offsets, or the first time domain resource is a last time domain resource of L time domain resources after being sequentially arranged in chronological order, each time domain resource in the L time domain resources is determined based on at least one reference time moment in the T reference time moments and at least one time domain offset in the S time domain offsets, and reference time moments and/or time domain offsets corresponding to different time domain resources are different, wherein:

the T reference time moments are T reference time moments in the P reference time moments, and T is a positive integer less than or equal to P; and the S time domain offsets are S time domain offsets in the Q time domain offsets, S is a positive integer less than or equal to Q, and L is an integer greater than or equal to S or T.

9. The channel information receiving method according to claim 8, wherein a transmission parameter of the target PUSCH resource is determined by at least one of the following: the first downlink grant indication; the RRC signaling configuration; or the predefinition in the protocol.

10. The channel information receiving method according to claim 8, wherein the Q time domain offsets are determined based on a processing time, and the processing time is: a time for which the CSI is processed, or a time for which a Physical Downlink Shared Channel (PDSCH) is processed.

11. The channel information receiving method according to claim 8, wherein the P reference time moments comprise at least one of the following:

a time moment at which the first downlink grant is received;

a time moment at which Hybrid Automatic Repeat Request (HARQ) feedback information is transmitted, wherein the HARQ feedback information is HARQ feedback information corresponding to a Physical Downlink Shared Channel (PDSCH) of first downlink grant scheduling; or a time moment at which a first reference signal is received, wherein the first reference signal is a reference signal corresponding to the CSI report.

12. The channel information receiving method according to claim 8, wherein the time domain resource of the target PUSCH resource is the first available uplink time domain resource after the first time domain resource.

13. The channel information receiving method according to claim 8, wherein the target PUSCH resource is any one of the following:

a PUSCH resource corresponding to identification information of first downlink grant indication, a PUSCH resource associated with the CSI report, or a PUSCH resource determined by a terminal based on a magnitude of load of the CSI report.

14. The channel information receiving method according to claim 8, wherein a Channel Quality Indicator (CQI) comprised in the CSI report comprises at least one of the following: N CQIs with largest values in R CQIs, a variance of the R CQIs, or M CQIs with smallest values in the R CQIs, and the CQI is a CQI of a subband, R is equal to a quantity of subbands, and both N and M are positive integers less than or equal to R.

15. A terminal, comprising a processor; and a memory having a computer program or an instruction stored thereon, wherein the computer program or the instruction, when executed by the processor, causes a channel information sending method, comprising:

receiving, by a terminal, a first downlink grant, wherein the first downlink grant is used to indicate reporting of Channel State Information (CSI); and sending, by the terminal, a CSI report on a target Physical Uplink Shared Channel (PUSCH) resource, wherein a time domain resource of the target PUSCH resource is determined based on a first time domain resource determined based on P reference time moments and Q time domain offsets, and the Q time domain offsets are determined by at least one of the following: first downlink grant indication, Radio Resource Control (RRC) signaling configuration, or predefinition in a protocol, wherein P and Q are positive integers, wherein the first time domain resource is determined when at least one of the following is satisfied:

the first time domain resource is located after a first reference time moment, and there is a first time domain offset between the first time domain resource and the first reference time moment, the first reference time moment is a last reference time moment of T reference time moments after being sequentially arranged in chronological order, and the first time domain offset is a largest time domain offset in S time domain offsets, or a sum of the S time domain offsets, or the first time domain resource is a last time domain resource of L time domain resources after being sequentially arranged in chronological order, each time domain resource in the L time domain resources is determined based on at least one reference time moment in the T reference time moments and at least one time domain offset in the S time domain offsets, and reference time moments or time domain offsets corresponding to different time domain resources are different, wherein:

the T reference time moments are T reference time moments in the P reference time moments, and T is a positive integer less than or equal to P; and the S time domain offsets are S time domain offsets in the Q time domain offsets, S is a positive integer less than or equal to Q, and L is an integer greater than or equal to S or T.

16. The terminal according to claim 15, wherein a transmission parameter of the target PUSCH resource is determined by at least one of the following: the first downlink grant indication, the RRC signaling configuration, or the predefinition in the protocol.

* * * * *